(12) United States Patent
Chen et al.

(10) Patent No.: US 11,388,660 B2
(45) Date of Patent: Jul. 12, 2022

(54) UPDATING CLIENT DEVICE COMMUNICATION WITH ELECTRONIC DEVICE WITHIN A NETWORK

(71) Applicant: ARRIS Enterprises LLC, Suwanee, GA (US)

(72) Inventors: Rui Chen, Shenzhen (CN); Liang Wang, Shenzhen (CN); Xinhua Xiao, Shenzhen (CN); Bei Li, Shenzhen (CN); Xiaojian Xia, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 18 days.

(21) Appl. No.: 17/259,753

(22) PCT Filed: Jan. 10, 2020

(86) PCT No.: PCT/CN2020/071373
§ 371 (c)(1),
(2) Date: Jan. 12, 2021

(87) PCT Pub. No.: WO2021/138896
PCT Pub. Date: Jul. 15, 2021

(65) Prior Publication Data
US 2022/0132403 A1    Apr. 28, 2022

(51) Int. Cl.
*H04W 12/50* (2021.01)
*H04W 84/12* (2009.01)
(Continued)

(52) U.S. Cl.
CPC ........... *H04W 48/16* (2013.01); *H04W 12/50* (2021.01); *H04W 76/10* (2018.02); *H04W 84/12* (2013.01)

(58) Field of Classification Search
CPC ....... H04W 12/06; H04W 4/80; H04W 12/04; H04W 12/50; H04W 12/08;
(Continued)

(56) References Cited

U.S. PATENT DOCUMENTS

| | | | | |
|---|---|---|---|---|
| 2005/0135236 A1* | 6/2005 | Benson | ................. | H04W 24/04 709/221 |
| 2012/0317619 A1* | 12/2012 | Dattagupta | ........... | H04W 12/50 726/4 |

(Continued)

FOREIGN PATENT DOCUMENTS

| | | |
|---|---|---|
| CN | 104202799 | 12/2014 |
| CN | 107087291 | 8/2017 |
| CN | 107613471 | 1/2018 |

OTHER PUBLICATIONS

International Search Report and Written Opinion of the International Searching Authority dated Oct. 15, 2020, in International (PCT) Application No. PCT/CN2020/071373.

*Primary Examiner* — Daniel Lai
(74) *Attorney, Agent, or Firm* — Wenderoth, Lind & Ponack, L.L.P.

(57) ABSTRACT

A system, method, and computer-readable recording media. Initially establishing a first wireless communication connection between a client device (CD) and an electronic device (ED) with a first primary SSID/passphrase. Storing a backup SSID/passphrase in the ED. Sending a message from the ED to the CD, the message including the backup SSID/passphrase. Storing the backup SSID/passphrase in the CD. Replacing the first primary SSID/passphrase on the ED with a second primary SSID/passphrase. After the first wireless communication connection between the CD and the ED is lost, retrieving, within the CD, the backup SSID/passphrase, and establishing a second wireless communication connection between the CD and the ED. After second wireless (Continued)

communication connection is established, sending a message including second primary SSID/passphrase from the ED to the CD. Storing second primary SSID/passphrase in the CD. Establishing a third wireless communication connection between the CD and the ED with the second primary SSID/passphrase.

12 Claims, 3 Drawing Sheets

(51) Int. Cl.
    *H04W 48/16*     (2009.01)
    *H04W 76/10*     (2018.01)

(58) Field of Classification Search
CPC ... H04W 12/041; H04W 84/12; H04W 76/10; H04W 12/0431; H04W 76/19; H04W 12/37; H04W 12/0471; H04W 80/02; H04W 76/25; H04W 24/02; H04W 24/04; H04W 12/062; H04W 12/30; H04W 12/0433; H04W 40/24; H04W 48/16
See application file for complete search history.

(56) References Cited

U.S. PATENT DOCUMENTS

2017/0208632 A1*   7/2017   Gunasekara  ........ H04L 67/2833
2019/0342147 A1    11/2019   O'Reirdan et al.

* cited by examiner

UPDATING CLIENT DEVICE COMMUNICATION WITH ELECTRONIC DEVICE WITHIN A NETWORK

TECHNICAL FIELD

The subject matter of the present disclosure relates generally to updating client device communication with an electronic device within a network.

BACKGROUND

When a electronic device identification of a WIFI network is changed, users are required to manually reconnect clients to the WIFI network with the new identification. The electronic device identification can be a service set identifier and passphrase or service key (SSID/passphrase). When a user has large numbers of clients, the amount of time and money associated with these manual reconnections can be prohibitive.

Thus, it would be advantageous and an improvement over the relevant technology to provide a system and/or a method that is capable of providing a reconnecting mechanism so that a user can reconnect at least one client to the WIFI network after a password change or other authentication change.

SUMMARY

Embodiments described in the present disclosure provide methods to update a client device access after a change in identification of an electronic device within a network. The electronic device identification includes a service set identifier and/or a passphrase or security key (SSID/passphrase). The methods include initially establishing a first wireless communication connection between a client device and an electronic device with a first primary SSID/passphrase. A backup SSID/passphrase is stored in the electronic device. The electronic device then sends a message via the first wireless communication connection to the client device, with the message including the backup SSID/passphrase. The backup SSID/passphrase is stored in the client device. The first primary SSID/passphrase on the electronic device is replaced with a second primary SSID/passphrase. After the first wireless communication connection between the client device and the electronic device is lost, the client device retrieves the backup SSID/passphrase and establishes a second wireless communication connection between the client device and the electronic device with the backup SSID/passphrase. After the second wireless communication connection is established using the backup SSID/passphrase, the electronic device sends a message via the second wireless communication connection to the client device. The message includes the second primary SSID/passphrase. The second primary SSID/passphrase is stored in the client device. A third wireless communication connection between the client device and the electronic device is established with the second primary SSID/passphrase.

Embodiments described in the present disclosure provide a non-transitory computer-readable recording medium in each of a electronic device and at least one client for updating client device communication with an electronic device within a network, each non-transitory computer-readable recording medium storing one or more programs which when executed by a respective processor performs a method as mentioned above.

Embodiments described in the present disclosure provide systems for updating a client device access to a wireless network after a change in identification of an electronic device within the network. The systems include at least a electronic device and at least one client device, each client device having an application installed and memories to store the application. The electronic device and the at least one client device are configured to communicate and receive messages and transmit requests using a network connection.

The electronic device with a first primary SSID/passphrase is configured to establish a first wireless communication connection between the client device and the electronic device and to store a backup SSID/passphrase. The electronic device is configured to send a message to the client device via the first wireless communication connection, with the message including the backup SSID/passphrase. The message is send once the client device connects to the electronic device with the first primary SSID/passphrase successfully. The client device is configured to store the backup SSID/passphrase based on content in a database within the client device. The electronic device is configured to replace the first primary SSID/passphrase of the electronic device to a second primary SSID/passphrase. The client device is also configured to retrieve the backup SSID/passphrase and establish a second wireless communication connection between the client device and the electronic device with the backup SSID/passphrase once the first wireless communication connection is lost. The electronic device is configured to send a message to the client device via the second wireless communication connection, with the message including the second primary SSID/passphrase once the client device connects to the electronic device with the backup SSID/passphrase. The client device is configured to store the second primary SSID/passphrase based on content in a database within the client device. The electronic device is configured to establish a third wireless communication connection with the client device with the second primary SSID/passphrase.

BRIEF DESCRIPTION OF THE DRAWINGS

In the drawings, like reference numbers generally indicate identical, functionally similar, and/or structurally similar elements.

DETAILED DESCRIPTION

Figure 1:
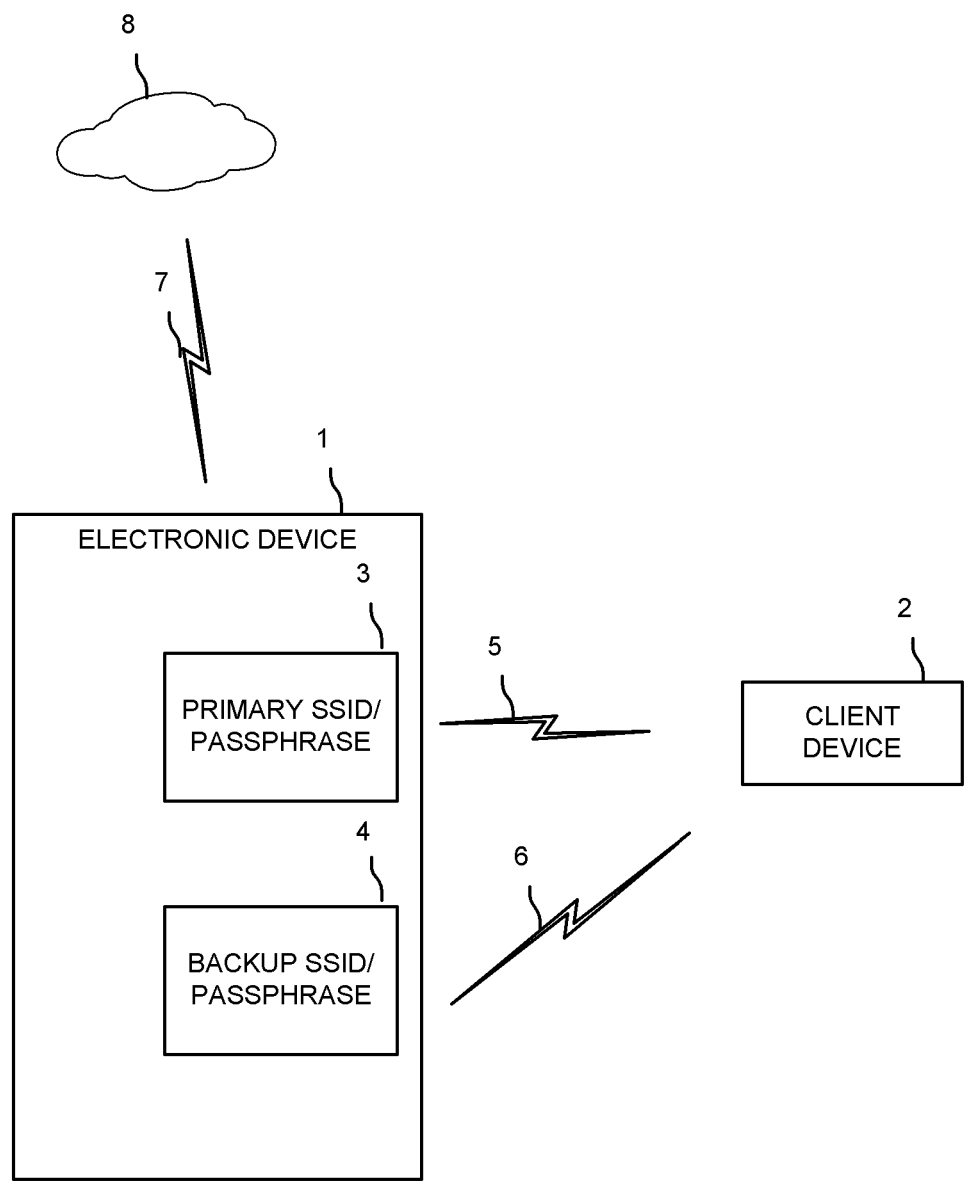
FIG. 1 is a schematic diagram of a system for implementing a mechanism for updating client device communication with an electronic device within a network according to an embodiment of the present disclosure.

FIG. 1 is a schematic diagram of a system for implementing a mechanism for updating client device 2 communication with an electronic device 1 within a network. As shown in FIG. 1, the system includes the electronic device 1. The electronic device can be a modem or router, for example. The electronic device has an identification that includes at least a primary SSID/passphrase 3 and a backup SSID/passphrase 4. As mentioned above, the electronic device identification can be a service set identifier and passphrase or service key (SSID/passphrase). The electronic device 1 can be connected to at least one wireless client device 2. The client device 2 is a device that transmits and receives WIFI within a network. A first wireless communication connection between the client device 2 and the electronic device 1 with a first primary SSID/passphrase is initially established. When referring to one specific client device 2 or location within the following description below, only one of the particular component may be listed as an example of how all may operate. When describing how multiple of each component operates together, several of the component may be called out by number (i.e. #1, #2).

Figure 2:
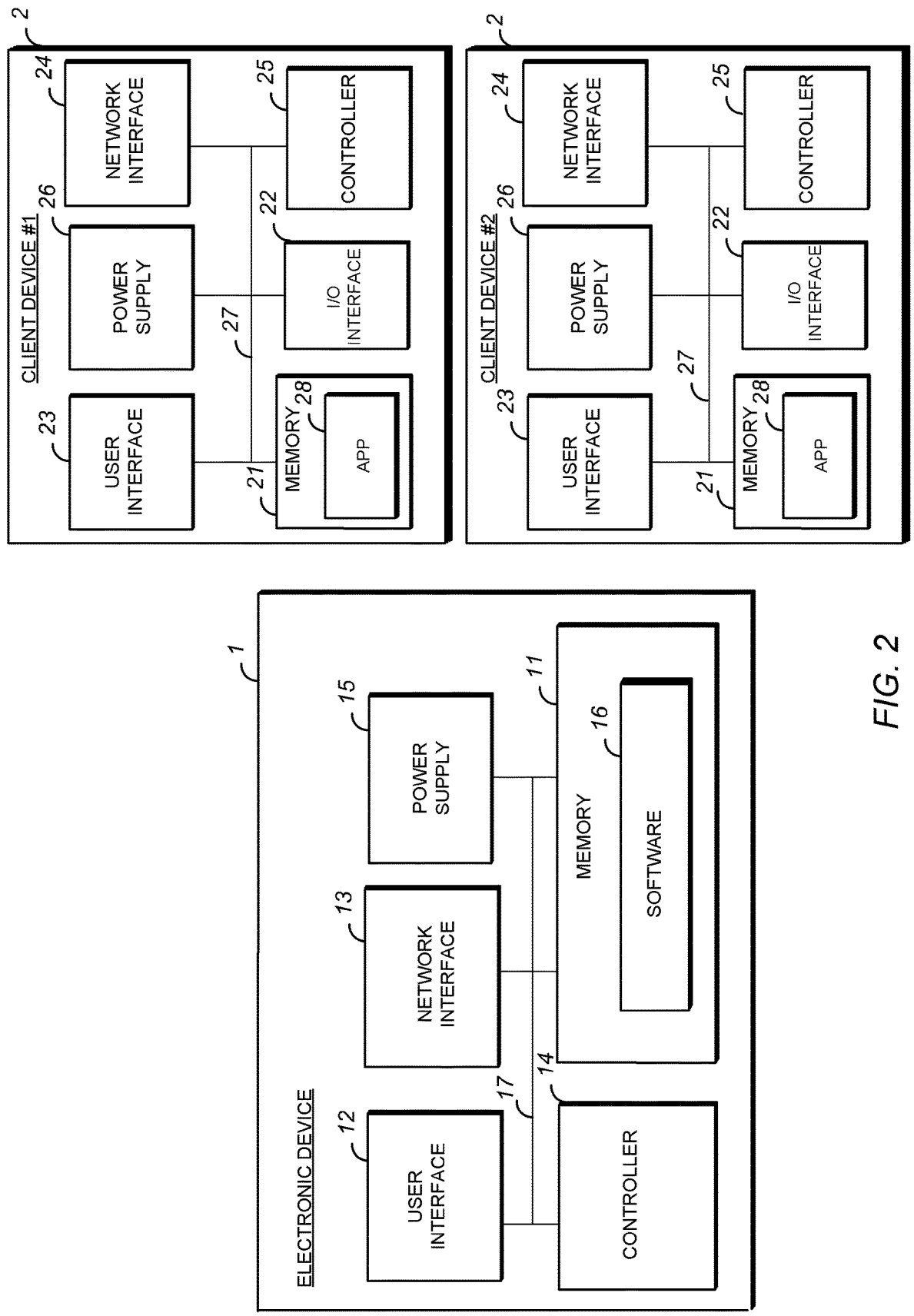
FIG. 2 is a schematic diagram of a system for implementing a mechanism for updating client device communication with an electronic device within a network according to an embodiment of the present disclosure.

An explanation of exemplary internal components of the electronic device 1 and the at least one client device 2 shown in FIG. 1 will be provided in the discussion of FIG. 2. However, in general, it is contemplated by the present disclosure that the electronic device 1 and the at least one client device 2 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the electronic device 1 and the at least one client device 2 may be adapted to execute any operating system, including Linux, UNIX, Windows Server, etc., MacOS, DOS, as well as virtual machines adapted to virtualize execution of a particular operating system, including customized and proprietary operating systems, as well as virtual containers including Docker and LXC (Linux containers). The electronic device 1 and the at least one client device 2 are further equipped with components to facilitate communication with other computing devices over one or more wireless network connections. The network connections include connections to local and wide area networks, wireless networks, public and private networks, and any other communication network enabling communication in the system.

The at least one client device 2 can be, for example, a personal computer, laptop, smartphone, tablet computer, personal digital assistant, in-vehicle computing systems, or other similar computing device. The connection 5, 6 between the electronic device 1 and the at least one client device 2 is implemented through a wireless communication connection that operates in accordance with, but is not limited to, IEEE 802.11 protocol, a Radio Frequency For Consumer Electronics (RF4CE) protocol, ZigBee protocol, or IEEE 802.15.4 protocol.

The client device 2 includes one or more memories or memory locations for storing the software components. The one or more memories in the client devices 2 include, but are not limited to, random access memory (RAM), dynamic random access memory (DRAM), read only memory (ROM), logic blocks of a field programmable gate array (FPGA), erasable programmable read only memory (EPROM), and electrically erasable programmable ROM (EEPROM).

The client device 2 can include a user interface such as a key board, mouse, touchscreen display, network connection between user and electronic device or other system components to allow a user to view and interact with the applications, tools, services, and other software of the client devices 2. The present disclosure contemplates that more than one client device 2 can be a part of the system as is shown in FIG. 1.

FIG. 2 illustrates a schematic diagram of a system for implementing a mechanism for updating client device 2 communication with an electronic device 1 within a network according to an embodiment of the present disclosure. FIG. 2 is a more detailed description of the exemplary internal components of the electronic device 1 and the at least one client device 2 shown in FIG. 1.

The at least one client device 2 is any handheld computer, smartphone, electronic tablet, e-reader, personal digital assistant (PDA), in-vehicle computing systems, or other similar computing device capable of connecting to the Internet, cellular networks, and interconnect with other devices via Wi-Fi.

It is contemplated by the present disclosure that the electronic device 1 includes electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 2, the exemplary client device 2 includes a memory 21, an I/O interface 22, a user interface 23, a network interface 24, a controller 25, and a power supply 26. The memory 21 includes a single memory or one or more memories or memory locations that include, but are not limited to, a random access memory (RAM), a dynamic random access memory (DRAM), a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy.

The memory 21 can be used to store any type of instructions including software such as a mobile application 28 associated with algorithms, processes, or operations for controlling the general functions and operations of the client device 2 including the operations of software as well as any operating system such as Linux, UNIX, Windows Server, or other customized and proprietary operating systems.

The power supply 26 can be used to power the various components of the client device 2 through an internal electrical bus 27. The power supply 26 can be self-contained, such as a battery pack, and/or the power supply 26 can include an interface to be powered through an electrical outlet (e. g. either directly or through another device). The power supply 26 can also include a rechargeable battery that can be detached allowing for replacement such as a nickel-cadmium (NiCd), NiMH (NiMH), a lithium-ion (Li-ion), or a lithium Polymer (Li-pol) battery.

The I/O interface 22 can be an interface for enabling the transfer of information between client device 2 and external devices connected to the client device 2 that need special communication links for interfacing with the controller 25. The I/O interface 22 can be implemented to accommodate various connections to the client device 2 that include, but is not limited to, a universal serial bus (USB) connection, parallel connection, a serial connection, coaxial connection, a High-Definition Multimedia Interface (HDMI) connection, or other known connection in the art connecting to external devices.

The user interface 23 is implemented for allowing communication between a user and the client device 2. The user interface 23 includes, but is not limited to, a push buttons, a mouse, a keyboard, a keypad, a liquid crystal display (LCD), cathode ray tube (CRT), thin film transistor (TFT), light-emitting diode (LED), high definition (HD) or other similar display device including a display device having touch screen capabilities. The network interface 94 is a software and/or hardware interface implemented to establish a connection between the client device 2 and the electronic device 1 in the system described in FIG. 1. It is contemplated by the present disclosure that the network interface 24 includes software and/or hardware interface circuitry for establishing communication connections with the rest of the system using both wired and wireless connections 5, 6 for establishing connections to, for example, a telephone network, the Internet, a computer network, a local area networks (LANs), wide area networks (WANs), metropolitan area networks (MANs), a virtual private network (VPN), personal area networks (PANs), wireless local area networks (WLANs), system area networks (SANs), a public switched telephone network (PTSA), a global Telex network, or a 2G, 3G, 4G, or 5G network, and other similar networks.

The controller 25 is used for controlling the general operations of the client device 2. The controller 25 can be, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the client device 2. Communication between the components of the client device 2 (e.g., 21-26) are established using the internal bus 27.

It is contemplated by the present disclosure that the electronic device 1 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 2, the exemplary electronic device 1 includes a memory 11, a user interface 12, a network interface 13, a controller 14, and a power supply 15. The memory 11 can be, but not limited to, a random access memory (RAM), a dynamic random access memory (DRAM), a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy.

The memory 11 can be used to store any type of instructions including software 16 associated with algorithms, processes, or operations for controlling the general functions and operations of the electronic device 1 including the operations of software as well as any operating system such as Linux, UNIX, Windows Server, or other customized and proprietary operating systems.

The power supply 15 can be used to power the various components of the electronic device 1 through an internal electrical bus 17. The power supply 15 can be self-contained, such as a battery pack, and/or the power supply 15 can include an interface to be powered through an electrical outlet (e. g. either directly or through another device). The power supply 15 can also include a rechargeable battery that can be detached allowing for replacement such as a nickel-cadmium (NiCd), NiMH (NiMH), a lithium-ion (Li-ion), or a lithium Polymer (Li-pol) battery.

The user interface 12 is implemented for allowing communication between a user and the electronic device 1. The user interface 12 includes, but is not limited to, a push buttons, a mouse, a keyboard, a keypad, a liquid crystal display (LCD), cathode ray tube (CRT), thin film transistor (TFT), light-emitting diode (LED), high definition (HD) or other similar display device including a display device having touch screen capabilities. The network interface 13 is a software and/or hardware interface implemented to establish a connection between the electronic device 1 and the client device 2 in the system described in FIG. 1. It is contemplated by the present disclosure that the network interface 13 includes software and/or hardware interface circuitry for establishing communication connections with the rest of the system using both wired and wireless connections 5, 6 for establishing connections to, for example, a telephone network, the Internet, a computer network, a local area networks (LANs), wide area networks (WANs), metropolitan area networks (MANs), a virtual private network (VPN), personal area networks (PANs), wireless local area networks (WLANs), system area networks (SANs), a public switched telephone network (PTSA), a global Telex network, or a 2G, 3G, 4G, or 5G network, and other similar networks.

The controller 14 is used for controlling the general operations of the electronic device 1. The controller 14 can be, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the electronic device 1. Communication between the components of the electronic device 1 (e.g., 11-16) are established using the internal bus 17.

Figure 3:
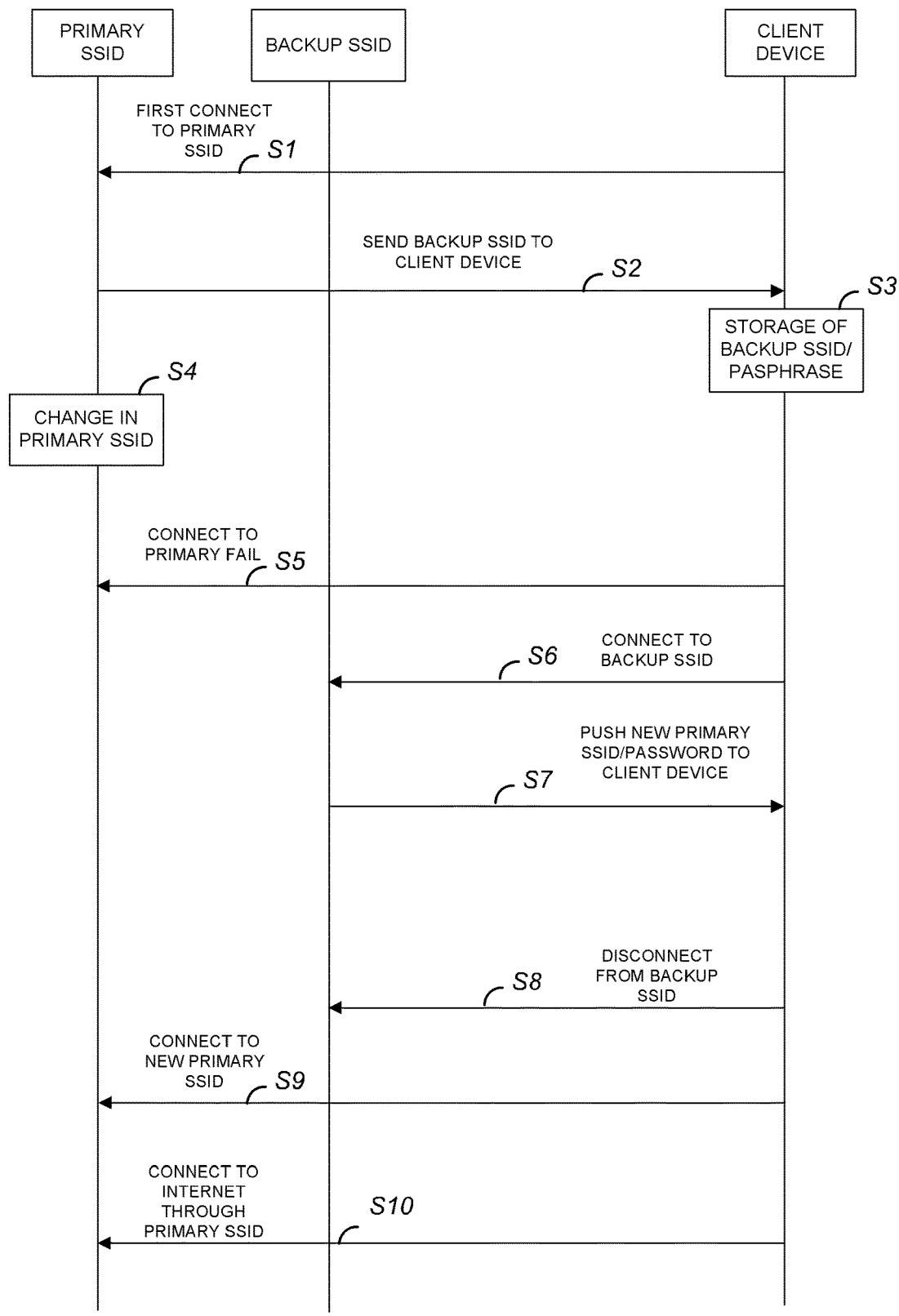
FIG. 3 illustrates a method for implementing a mechanism for updating client device communication with an electronic device within a network using the system of FIG. 1 according to an embodiment of the present disclosure.

FIG. 3 illustrates a method for updating client device communication with an electronic device within a network using the system of FIG. 1 and FIG. 2.

Initially in step S1, a first wireless communication connection is established between the client device 2 and the electronic device 1 using a first primary SSID/passphrase. The electronic device 1 includes a stored backup SSID/passphrase. The electronic device 1 sends a message via the first wireless communication connection to the client device 2 in step S2. The message includes the backup SSID/passphrase. Step S3 includes the storage of the backup SSID/passphrase in the client device 2.

At some point the first primary SSID/passphrase is replaced with a second primary SSID/passphrase in step S4. The replacement of the first primary SSID/passphrase with the second primary SSID/passphrase can be controlled through one of at least one client devices 2, or through WebGUI, a content management system, for example. Changing the SSID/passphrase on the electronic device 1 can cause all current WIFI devices on the network to lose connection. Once there is a change from the first primary SSID/passphrase, the first wireless communication connection between the electronic device 1 and the client device 2 is lost in step S5. In certain embodiments, there is a pre-determined delay in time before the first wireless communication connection between the client device 2 and the electronic device 1 is lost after the first primary SSID/passphrase is changed. The stored backup SSID/passphrase in the client device 2 is retrieved to be used to connect with the electronic device 1 using a second wireless communication connection in step S6. Certain embodiments include additional attempts to connect the client device 2 with the second wireless communication connection to the electronic device 1 using the backup SSID/passphrase when the connection of the client device 2 is lost. These additional attempts can be made with a predetermined amount of time in between attempts. Once the second wireless communication connection is established using the backup SSID/passphrase, the electronic device 1 sends, via the second wireless communication connection, a message that includes the second primary SSID/passphrase in step S7. The client device 2 then disconnects from the backup SSID/passphrase in step S8. The client device 2 then retrieves the second primary SSID/passphrase and a third wireless communication connection is established between the client device 2 and the electronic device 1 with the second primary SSID/passphrase in step S9. The client device 2 is connected to the Internet through the electronic device 1 and the second primary SSID/passphrase in step S10 through the third wireless communication connection. The client device 2 maintains the storage of the backup SSID/passphrase for the situation when the primary SSID/passphrase is changed again.

Controls are sent through the application on each client device 2 for the client device 2 to connect with the new SSID/passphrase that is stored in the client device 2. When there is a switch in the SSID/passphrase that is to be used, a control is sent from the application within the client device 2 to the client device 2 to use the new SSID/passphrase to attempt to reconnect with the electronic device 1.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components which perform a part or all of the functions of the secure conditional access architecture.

The present disclosure includes the use of computer programs or algorithms. The programs or algorithms can be stored on a non-transitory computer-readable medium for causing a computer, such as the one or more processors, to execute the steps described in FIG. 3. For example, the one or more memories stores software or algorithms with executable instructions and the one or more processors can execute a set of instructions of the software or algorithms in association with executing generating, processing provisioning requests and provisioning messages, as described in FIG. 3.

The computer programs, which can also be referred to as programs, software, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner.

The subject matter of the present disclosure is provided as examples of systems, methods, and programs for performing the features of the secure conditional access architecture. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method, comprising:
   initially establishing a first wireless communication connection between a client device and an electronic device with a first primary SSID/passphrase;
   storing a backup SSID/passphrase in the electronic device;
   sending, via the first wireless communication connection, a first message from the electronic device to the client device, the first message including the backup SSID/passphrase;
   storing the backup SSID/passphrase in the client device;
   replacing the first primary SSID/passphrase on the electronic device with a second primary SSID/passphrase;
   after the first wireless communication connection between the client device and the electronic device is lost, retrieving, within the client device, the backup SSID/passphrase, and establishing a second wireless communication connection between the client device and the electronic device with the backup SSID/passphrase;

after the second wireless communication connection is established using the backup SSID/passphrase, sending, via the second wireless communication connection, a second message from the electronic device to the client device, the second message including the second primary SSID/passphrase; and establishing a third wireless communication connection between the client device and the electronic device with the second primary SSID/passphrase.

2. The method according to claim 1, further comprising repeating attempts, with a predetermined amount of time in between attempts, to connect the client device via the second wireless communication connection to the electronic device using the backup SSID/passphrase when the first wireless communication connection of the client device is lost.

3. The method according to claim 1, wherein there are a plurality of client devices.

4. The method according to claim 3, wherein the replacement of the first primary SSID/passphrase with the second primary SSID/passphrase is controlled through one of the plurality of client devices.

5. The method according to claim 1, wherein the replacement of the first primary SSID/passphrase with the second primary SSID/passphrase is controlled through a web content management system.

6. The method according to claim 1, wherein there is a pre-determined delay in time before the first wireless communication connection between the client device and the electronic device is lost after the first primary SSID/passphrase is replaced with the second primary SSID/passphrase.

7. A non-transitory computer-readable recording medium in each of the electronic device and the client device, each non-transitory computer-readable recording medium storing one or more programs which when executed by a respective processor performs the method according to claim 1.

8. A system, comprising:
an electronic device; and
at least one client device, each client device includes an application installed and memories to store the application;
the electronic device and the at least one client device being configured to communicate and receive messages and transmit requests using a network connection, wherein
the electronic device with a first primary SSID/passphrase is configured to establish a first wireless communication connection between the client device and storing a backup SSID/passphrase;

the electronic device is configured to send a first message to the client device via the first wireless communication connection, the first message including the backup SSID/passphrase when the client device connects to the electronic device with the first primary SSID/passphrase successfully;

the client device is configured to store the backup SSID/passphrase based on content in a database within the client device;

the electronic device is configured to replace the first primary SSID/passphrase of the electronic device to a second primary SSID/passphrase;

the client device is configured to retrieve the backup SSID/passphrase and establish a second wireless communication connection between the client device and the electronic device with the backup SSID/passphrase when the first wireless communication connection is lost;

the electronic device is configured to send a second message to the client device via the second wireless communication connection, the second message including the second primary SSID/passphrase when the client device connects to the electronic device with the backup SSID/passphrase successfully;

the client device is configured to store the second primary SSID/passphrase based on content in the database within the client device; and the electronic device is configured to establish a third wireless communication connection with the client device with the second primary SSID/passphrase.

9. The system according to claim 8, further comprising repeating attempts, with a predetermined amount of time in between attempts, to connect to the client device via the second wireless communication connection to the electronic device using the backup SSID/passphrase when the first wireless communication connection of the client device is lost.

10. The system according to claim 8, wherein the replacing of the first primary SSID/passphrase with the second primary SSID/passphrase is controlled through the at least one client device.

11. The system according to claim 8, wherein the replacing of the first primary SSID/passphrase with the second primary SSID/passphrase is controlled through a web content management system.

12. The system according to claim 8, wherein there is a pre-determined delay in time before the first wireless communication connection between the client device and the electronic device is lost after the first primary SSID/passphrase is replaced with the second primary SSID/passphrase.

* * * * *